Dec. 31, 1957  A. R. KIRKHAM  2,817,995
OPTICAL COMPENSATING SYSTEM FOR KINETOGRAPHS
OF THE CONSTANTLY-MOVING-FILM TYPE
Filed June 8, 1954
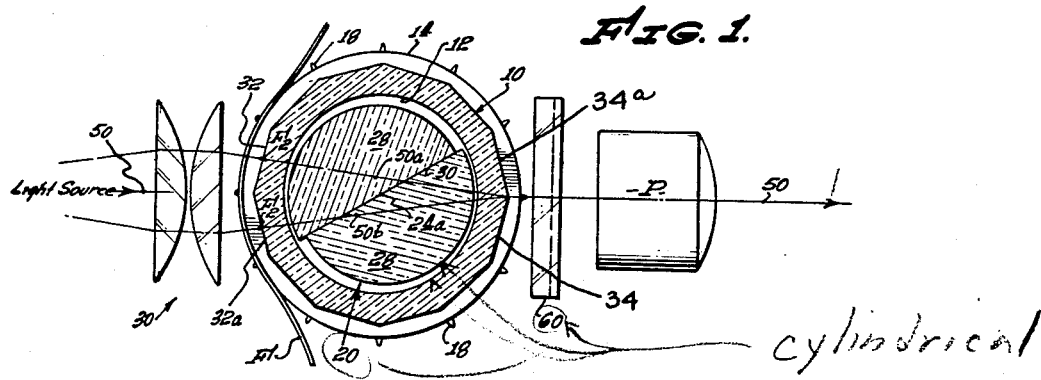
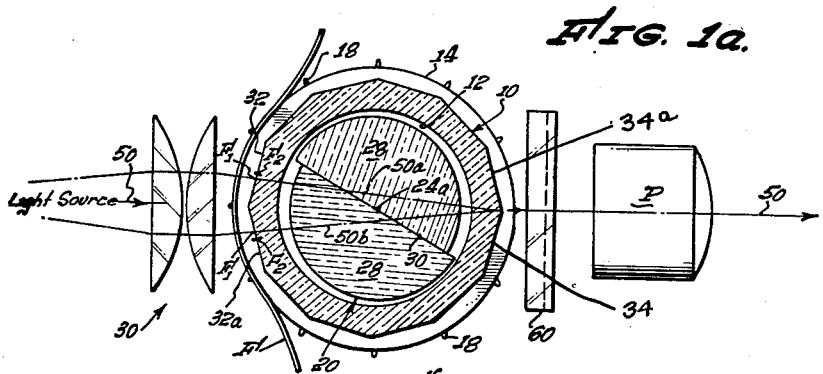
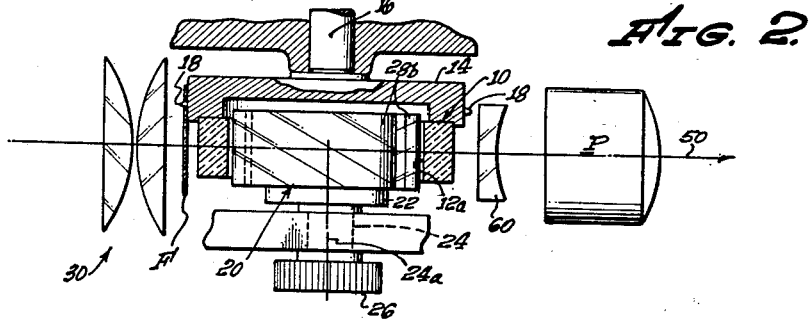
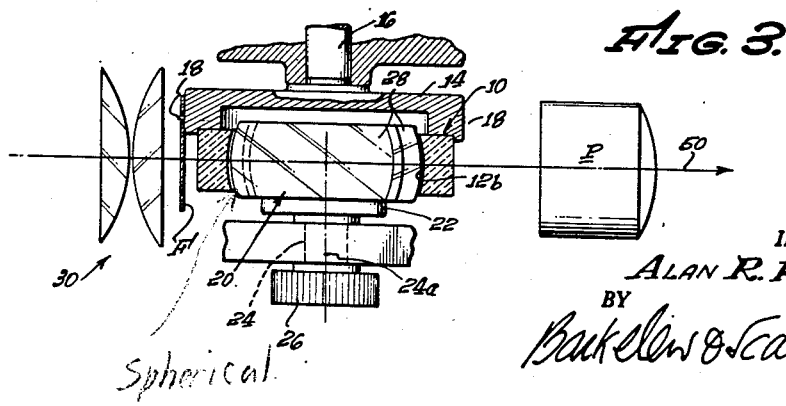
INVENTOR.
ALAN R. KIRKHAM,
BY
Bakelew & Cawlebery
ATTORNEYS.

United States Patent Office
2,817,995
Patented Dec. 31, 1957

2,817,995

OPTICAL COMPENSATING SYSTEM FOR KINETOGRAPHS OF THE CONSTANTLY-MOVING-FILM TYPE

Alan R. Kirkham, Glendale, Calif., assignor to Mitchell Camera Corporation, Los Angeles, Calif., a corporation of Delaware Application June 8, 1954, Serial No. 435,177

4 Claims. (Cl. 88—16.8)

This invention has to do with optical compensating systems in kinetographs in which the film may, and characteristically does, move at a constant rate; and relates more particularly to compensating systems of the prismatic type, such for instance as the rotating multi-faced prism type described in the paper "New 35 mm. television film scanner," Journal SMPTE, vol. 62, January 1954, page 45.

The present invention is applicable to kinetographs of the indicated type, whether used in scansion systems or used as a projector or a camera. The following description will treat of the invention as used for example for picture projection, but as will appear, it is equally applicable to any of the uses to which a continuous kinetograph is put.

Kinetograph systems of the type with which the invention is concerned utilize a refracting prismatic element which moves with the moving film in such relation thereto as to stabilize a light ray which passes through any given point on the film. Although oscillating refracting prism elements have been proposed, the most practical form of prismatic compensator utilizes a rotating regular polygonal prism which is rotated in close proximity to the film at a circumferential speed corresponding to the film speed. Refraction of the light beam passing through two opposite parallel faces of the prism is intended to cause stabilization of the beam passing through any given film point.

Two difficulties are encountered. If the polygonal prism is solid, the refractive index of no available material is high enough to sufficiently displace a beam on its passage through the prism. And in systems of the type here concerned film shrinkage also has to be compensated. To meet those difficulties, the system described in the paper referred to uses a hollow polygonal prism and inserts in the interior an optical system which, by multiple reflection, increases the effective optical length of the light path through the prism; and, by including a variable glass thickness in that system, provides for adjustment of the effective optical length of light path to adjustably compensate for variant film shrinkage.

Another method of increasing the refractive displacement of the light beam has been proposed. If the cylindric interior of such a hollow prism is left open, the opposing concave glass faces, with air between them, form in effect a negative cylindric lens which increases the light beam displacement to an amount much more than wanted. It has been proposed to position in the hollow interior a core in the form of a positive cylindric lens of such size, surface curvature and refractive index as to reduce the negative lens effect to obtain the proper over-all refractive displacement. By inserting cores of different diameters—different positive lens powers—it has been proposed to compensate for film shrinkage.

The present invention provides, in very simple form, a compensating core in the form of a positive lens that, by rotational adjustment, is continuously adjustable in its effective compensating action, so as to provide fully accurate adjustment for variant film shrinkage. How the invention does that, and the nature of the invention itself, will be apparent from the following detailed descriptions of preferred and illustrative embodiments of the invention, illustrated in the accompanying drawings, where:

Fig. 1 is a schematic view in elevation illustrating the invention and showing the compensating core in one adjusted position;

Fig. 1a is a similar schematic view showing the compensating core in another adjusted position;

Fig. 2 is a schematic plan-section showing one illustrative form of the invention; and Fig. 3 is a similar schematic plan-section showing another illustrative form of the invention.

In the drawings a hollow polygonal prism, preferably of glass of a relatively high refraction index, is shown at 10. The number of faces, here shown as twelve, is immaterial; it is only necessary that the polygonal form be regular and have opposite parallel faces corresponding in size to the film frame size. As shown in Fig. 1, the interior hollow has a circular bounding surface 12 concentric with the polygonal formation. As shown in Fig. 2 that bounding surface may be cylindric, as at 12a; or as in Fig. 3 it may be spheric, as at 12b. The latter figure will be more particularly referred to later; the immediately following description referring first to Figs. 1 and 2.

Prism 10 is shown as set in and carried by a carrier member 14 which is rotatable on an axis 16 concentric with the prism axis. Although the film F may be carried, guided and moved in any suitable manner in a path suitably related to the prism, it is here shown as travelling circumferentially about member 14 close to the periphery of the prism. Member 14 is sprocketed with teeth 18, engaged by the film perforations. The rotational drive for the system may be via shaft 16 when the sprocket member 14 will drive the film; or the film may be primarily driven by any suitable drive (not shown) and then it will drive the sprocket and prism. In either arrangement the prism and film are driven in mutual synchronism.

The foregoing particular arrangements for obtaining properly corelated movements between prism and film are shown in the article above referred to, are not a part of the present invention, and are merely illustrative of means for obtaining that co-relation. So far as my invention is concerned that means may be anything suitable.

My compensating core, generally designated by the numeral 20, is mounted on a suitable carrier 22 which is rotatably mounted on an axis 24 concentric with the axis of the prism. The core axis, marked 24a in Fig. 1, is also concentric with the axis 24 and the axis of the prism. The core is rotationally adjustable by any suitable means, such for example as the simple hand knob 26.

The core is made up of two semi-cylindric halves 28 cemented together in off-set relation on the plane 30 of their flat surfaces with any suitable transparent cement preferably of substantially the same refractive index as the glass—for example, Canada balsam. The core, so made up, is mounted on the rotatable carrier in such position that it is symmetric about the axis 24a, which is the axis of the prism and the axis of rotative core adjustment.

A preferred method of making the core, is as follows. Two plane parallel pieces of glass of known thicknesses, preferably equal, optically surfaced at least on one face each, are cemented together on their optically finished faces. The equal and/or known thicknesses of the two pieces then facilitates the mounting of the assembly in a chuck, or on a face plate, of a grinding machine, with the axis of rotation of the chuck, etc. accurately in the central cemented plane. For instance, the assembly of equal thicknesses may be clamped between two chuck jaws which are accurately movable in opposition always equally spaced oppositely from the axis of rotation of the chuck. Or, on a face plate a clamping member may be accurately set with a clamping face, normal to the plane of rotation, spaced from the axis of rotation by the known thickness of one glass plate; the assembly being then simply clamped against that clamping face. As the result of any such mounting, the axis of rotation is accurately in the cemented plane.

Rotating the cemented assembly about that axis, a cylinder of the desired diameter is then ground and optically polished. The two cylindric halves are then uncemented, and then re-cemented together in their relatively off-set position such as shown in Fig. 1. The re-assembled core is then set in position on the carrier 22 with the symmetric core axis 24a coinciding with the axis of rotation of the carrier; which latter axis is, as said before, coincident with the axis of the prism.

A short reference to the necessary optical performance of the prismatic compensator may be of assistance to the understanding of my invention. In Fig. 1 the schematic lay-out is for example that of a projector with a light source as indicated, and condenser lens 30 concentrating light on film F. The light from any point on the film passes through one face, as face 32, of the prism, then through the prism and the compensator core to and through an opposite face, as 34, of the prism, and thence through projection lens P to the screen. Tracing such a ray backward (or forward, as it would be in a camera) it is sufficient for the purposes here to consider simply an axial ray 50—one that corresponds to the center of the picture. That ray, on passing into the prism at e. g. face 34 must be so refracted, as shown generally at 50a, as to emerge from the center of the opposite face 32 and strike the film F in the center of the film frame which normally lies either, in effect, directly on the face 32, or close to it. In either case the size of the face 32 corresponds with the size of the film frame; so that normally a ray passing through the center of the face passes through the center of the frame.

Correspondingly, the axial ray 50 passing into the prism at face 34a, must be refracted as shown generally at 50b to emerge from the center of opposite face 32a and strike the film in the center of the frame lying opposite that face. When the above conditions are met, the pictures of the succeeding frames coincide.

Now, as said before, the effective optical length of the light path through a solid prism of any available glass is not sufficient to cause refractive displacement of the ray by half a face length, or half a frame length. The negative lens effect of the central hollow in the prism will, in itself, increase the refractive displacement to much more than the desired amount. The core 20 is then so designed that, in such a position as shown in Fig. 1, where the light path through it is longer or longest, the refractive displacement is just that which is necessary to make the central beam 50 follow the center of the face 32 and the center of the film frame of full size (unshrunken) which corresponds in size to the face 32. If the film has shrunk in length, so that, as shown (exaggeratedly) in Fig. 1a, the center of the frame corresponding to face 32 lies at such a point as F1, displaced from the normal center point F2, the refractive displacement of the central ray 50 is correspondingly reduced by rotatively adjusting core 20 to such a position as shown in Fig. 1a where the light path through the positive-lens core is suitably reduced. The relative reduction in beam displacement will be readily understood by consideration of the fact that the power of any lens (the angle through which a passing ray is bent) varies with an inverse function of the lens thickness— the surface curvatures and other factors being constant, which is the case here. In the position of Fig. 1, the lens thickness of core 20 is larger than in the position of Fig. 1a. The positive lens action is therefore greater in the position of Fig. 1a than in that of Fig. 1; resulting in that the ray at 50a in Fig. 1a is refractively bent to a point F1 on the film, spaced a lesser distance from the optical axis O than is the point F2 to which the ray 50a is displaced with the lens-core 20 in the position of Fig. 1.

The difference between the angles to the normals at which the rays 50a, 50b strike the respective entering and emerging surfaces of the core, respectively in Figs. 1 and 1a, due to the different widths of the air gaps in those figures, also may play a part in the final effect of altering the displacement of the ray. That difference of angles in the actual optical system is very small— the drawings exaggerate the off-setting of the halves of the core for purposes of illustration. But the effect of that change of angles of incidence, small as it may be, is to displace the ray 50a relatively in conjunction with, rather than in opposition to, the displacements caused by the changing lens thickness. This effect of the changing angles of incidence may, however, be so small as to be negligible.

As one specific and illustrative example of my invention I give the following typical figures of a system using a twenty-sided prism, designed to handle for instance standard 16 mm. film and to compensate film shrinkage of about 1% in length. Prism 10, twenty sided, is 46 mm. in diameter as measured from face to face. Sprocketed carrier 14 is 1.906 inches in diameter on the land. The diameter of the prism hollow is 1.3385 inches. The radius of each cylindric half of the core 20 is 0.6413 inch; and the relative offset of the two halves is 0.004 inch. The glass of the polygonal prism 10 has a refractive index of 1.880; and that of the core 20 an index of about 1.74 (Eastman Kodak Co. No. 110).

Due to the fact that the lenses formed by the prism hollow and the core 20 are both cylindric, they of course distort the image (either the projected image, or the image on the film in a camera). To correct that distortion, another cylindric lens 60 is inserted in the optical train with its cylindric axis at right angles to the axis 24a. The negative power of that lens is so related to the average resultant negative power of 12 and 20 that it compensates the astigmatism caused by the cylindric lens effect of 12 and 20.

The necessity of utilizing such a corrective lens may be obviated by making both the exterior surface of core 20 and the interior surface 12 of the prism spheric instead of cylindric. That is shown in Fig. 3, where the prism has an interior spheric surface 12b and the core has an external spheric surface 28b. The illustrative dimensions and other criteria given for Fig. 2 may also apply to Fig. 3; except that, unless the prism is split to allow the insertion of the core, the air clearance between prism and core may have to be slightly increased, and corresponding changes made in e. g. the refractive index of the core.

In the following claims the term "projection" is used in the sense of including both the projection of a picture from a film as in a projector, and the projection of an image onto the film as in a camera.

I claim:

1. In a projection system which embodies a rotating polygonal prism having a circular hollow interior co-axial with the prism exterior, the combination of a compensating member in the form of a lenticular core positioned in the hollow interior and rotatably adjustable about the prism axis independently of prism rotation, said core, as seen in section on a plane normal to that axis, comprising two semi-circular halves joined together on their diameters and relatively offset from each other along those diameters.

2. The combination defined in claim 1 and in which the lenticular core is composed of semi-cylindric halves.

3. The combination defined in claim 1, in which the internal wall surface of the prism is spheric and in which the external surfaces of the core halves are spheric.

4. The combination defined in claim 1, and in which the lenticular core is symmetric with respect to said axis.

References Cited in the file of this patent

UNITED STATES PATENTS

| | | |
|---|---|---|
| 1,991,957 | Ranieri | Feb. 19, 1935 |
| 2,464,139 | Luboshez | Mar. 8, 1949 |
| 2,692,370 | Moore | Oct. 19, 1954 |

FOREIGN PATENTS

| | | |
|---|---|---|
| 234,155 | Switzerland | Jan. 3, 1945 |
| 279,948 | Switzerland | May 1, 1952 |